United States Patent
Yamazaki et al.

(10) Patent No.: US 7,159,294 B2
(45) Date of Patent: Jan. 9, 2007

(54) BURR REMOVAL APPARATUS FOR LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi. Pref. (JP)

( * ) Notice: Subject to any disclaimer, the term of this patent is extended or adjusted under 35 U.S.C. 154(b) by 0 days.

(21) Appl. No.: 11/121,427

(22) Filed: May 4, 2005

(65) Prior Publication Data

US 2005/0262684 A1    Dec. 1, 2005

(30) Foreign Application Priority Data

May 26, 2004    (JP) ............... 2004-155955

(51) Int. Cl.
| | |
|---|---|
| B23P 23/00 | (2006.01) |
| B23Q 1/01 | (2006.01) |
| B23C 1/12 | (2006.01) |
| B24B 9/00 | (2006.01) |
| B23K 26/00 | (2006.01) |

(52) U.S. Cl. ............... 29/564; 29/557; 409/202; 409/212; 409/140; 451/67; 219/121.6

(58) Field of Classification Search ............... 29/564, 29/557, 56.5, 33 A; 409/212, 140, 138, 139, 409/202, 235; 451/67; 219/121.6
See application file for complete search history.

(56) References Cited

U.S. PATENT DOCUMENTS

| | | | | |
|---|---|---|---|---|
| 4,559,684 A | * | 12/1985 | Pryor ............... | 29/557 |
| 4,661,680 A | | 4/1987 | Swensrud | |
| 5,351,399 A | * | 10/1994 | Neuhoffer et al. ....... | 29/895.31 |
| 5,548,890 A | | 8/1996 | Tada et al. | |
| 6,131,266 A | * | 10/2000 | Saunders ............... | 29/557 |
| 6,347,259 B1 | * | 2/2002 | Goldenberg et al. ....... | 700/218 |
| 2001/0023527 A1 | * | 9/2001 | Beyer et al. ............ | 29/527.7 |

FOREIGN PATENT DOCUMENTS

| | | |
|---|---|---|
| EP | 1 057 575 A2 | 12/2000 |
| JP | 61-182876 | 8/1986 |
| JP | 61-181644 | 11/1986 |
| JP | 63-95693 | 6/1988 |
| JP | 04-017991 | 1/1992 |
| JP | 07-266075 | 10/1995 |
| JP | 10-314969 | 12/1998 |
| JP | 11-207586 | 8/1999 |
| JP | 2003-285191 | 10/2003 |
| JP | 2004-074254 | 3/2004 |

OTHER PUBLICATIONS

European Search Report for corresponding Application No. 05009908.4 dated Aug. 29, 2005.

* cited by examiner

*Primary Examiner*—Dana Ross
(74) *Attorney, Agent, or Firm*—Renner, Otto, Boisselle & Sklar, LLP (57) ABSTRACT

The invention provides a burr removal apparatus for laser beam machine which removes burrs formed on the top surface of a workpiece.

When, for example, pilot holes PH are produced in a workpiece W by a laser machining tool 60, molten particles scatter to form whisker-like burrs Wb on the top surface of the workpiece. A whisker-like burr removal apparatus 700 has a machining head 710 which is raised and lowered by a cylinder 720. It removes the whisker-like burrs Wb with a machining tool 730.

5 Claims, 8 Drawing Sheets

BURR REMOVAL APPARATUS FOR LASER BEAM MACHINE

The present application is based on and claims priority of Japanese patent application No. 2004-155955 filed on May 26, 2004, the entire contents of which are hereby incorporated by reference.

BACKGROUND OF THE INVENTION

1. Field of the Invention

The present invention relates to a burr removal apparatus which removes whisker-like burrs formed on a workpiece surface by molten particles (spatter) scattered above under the pressure of assist gas during piercing on a laser beam machine in order to prevent them from coming into contact with a lower part of a nozzle, causing malfunctions of a profile sensor, and resulting in inability to carry out machining.

2. Description of the Related Art

Whisker-like burrs formed during laser machining of a stainless steel or aluminum workpiece are removed manually, as required, based on visual judgment, by stopping the machine, by a skilled operator with many years of experience.

There are known techniques which remove dross adhering to the underside of a workpiece using a rotary cutter or a grinder as the workpiece moves (see Japanese Patent Laid-Open Publication No. 7-266075 and Japanese Utility Model Laid-Open Publication No. 61-181644 (Patent Documents 1 and 2)).

Since it is difficult for unskilled operators to determine whether to remove whisker-like burrs such as those described above, unskilled operators cause frequent machine stoppages, machining defects, etc., resulting in inability to carry out machining.

SUMMARY OF THE INVENTION

The present invention provides an apparatus which solves the above problems.

A laser beam machine according to the present invention comprises, as basic means, a bed, a pallet which is disposed on the bed and holds a workpiece, a column which moves along an X axis, that is, in a longitudinal axis of the bed, a saddle which is supported by the column and moves along a Y axis orthogonal to the X axis, and a machining head which is supported by the saddle and moves along a Z axis perpendicular to a plane formed by the X axis and Y axis.

Also, it comprises a remover of whisker-like burrs formed on a top surface of a workpiece (especially, stainless steel or aluminum) during laser machining.

Besides, the whisker-like burr removal apparatus comprises a machining head raised and lowered from/to a workpiece surface, and a machining tool driven to rotate by the machining head.

Furthermore, the machining tool is a grinding tool or a cutting tool.

The present invention allows even an unskilled operator to operate a machine, enabling long, unattended operation without stopping the machine.

DETAILED DESCRIPTION OF THE PREFERRED EMBODIMENTS

Figure 1:
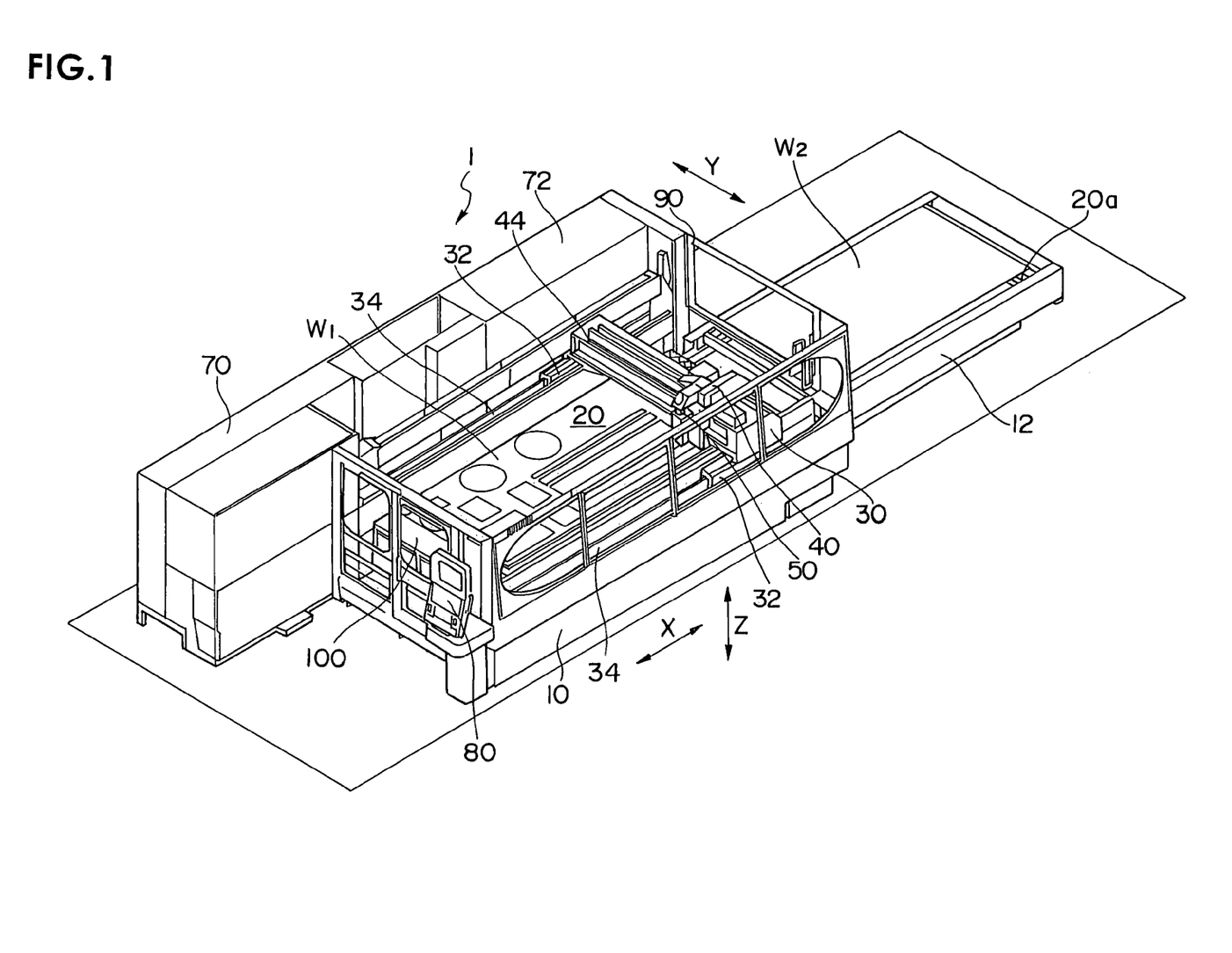
FIG. 1 is a perspective view showing an entire laser beam machine according to the present invention.
Figure 2:
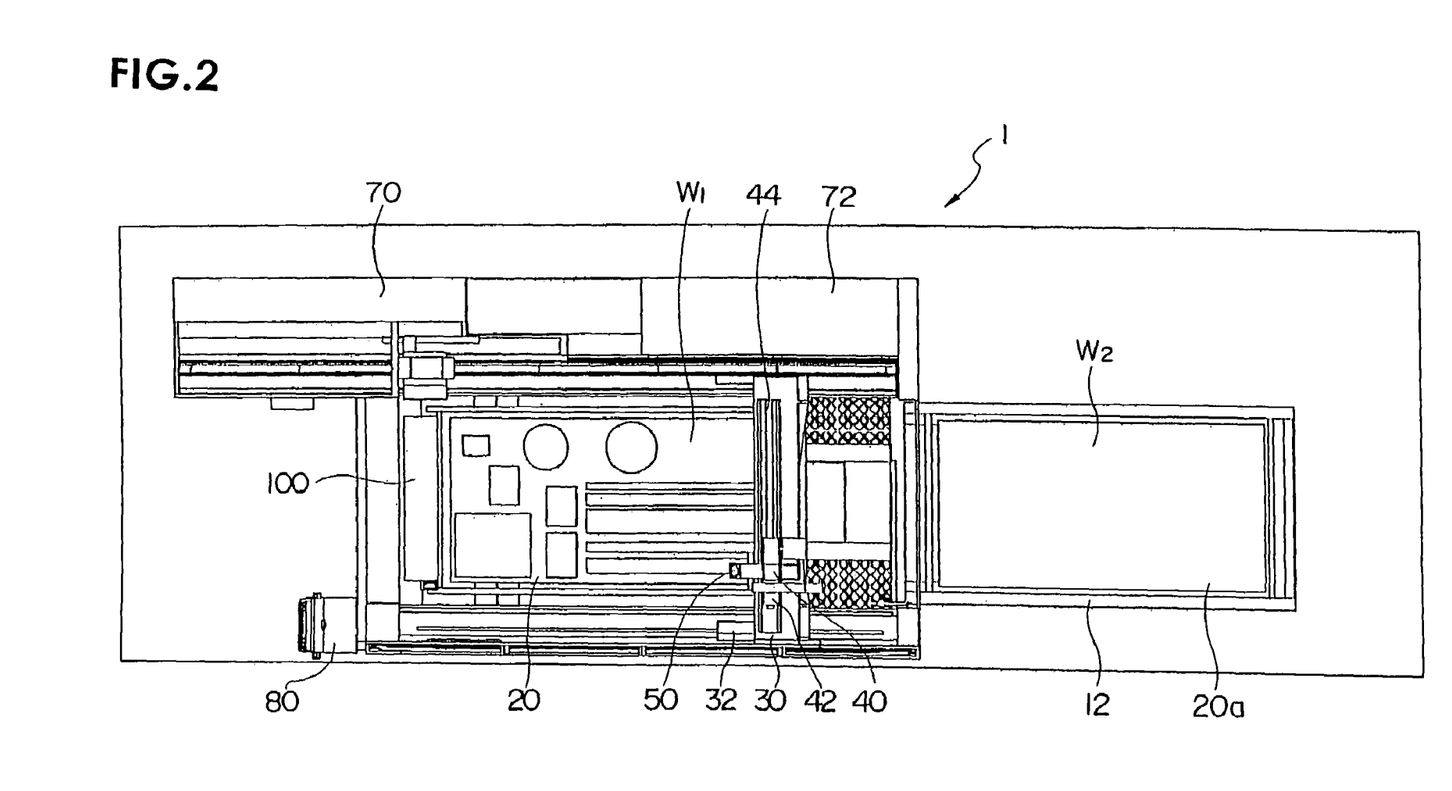
FIG. 2 is a plan view of the laser beam machine according to the present invention.
Figure 3:
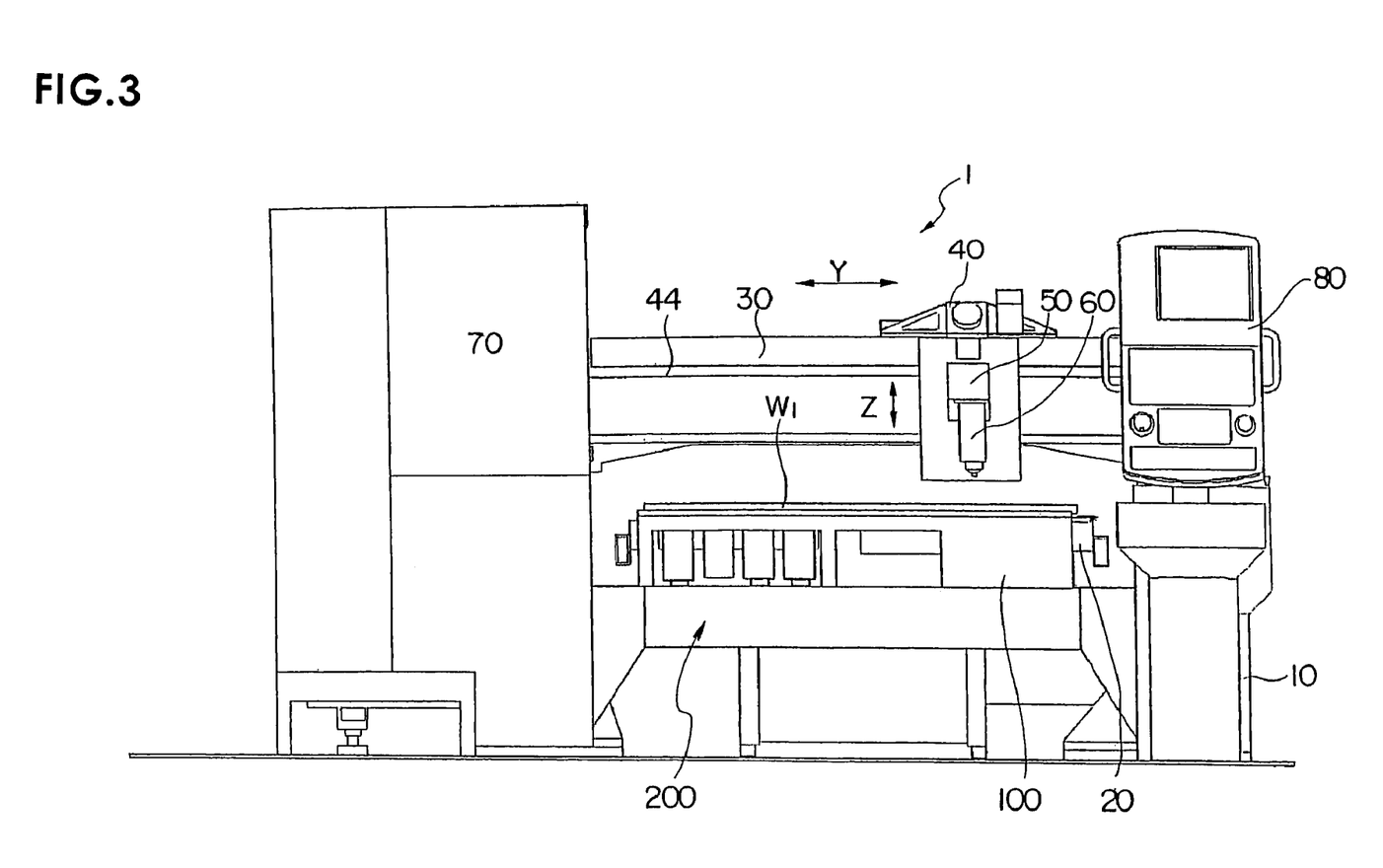
FIG. 3 is a front view of essential part of the laser beam machine according to the present invention.
Figure 4:
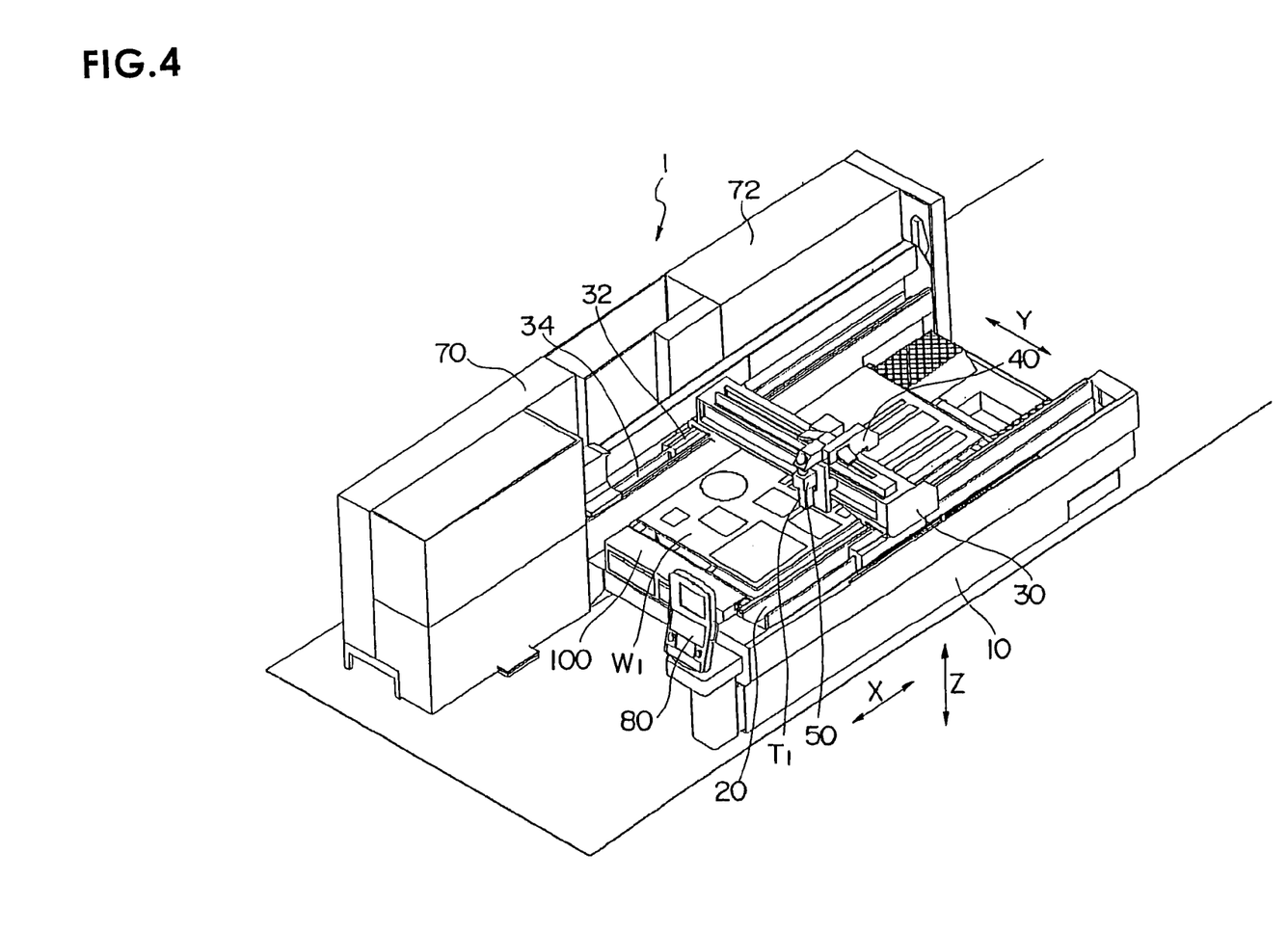
FIG. 4 is a perspective view of the essential part of the laser beam machine according to the present invention.
Figure 5:
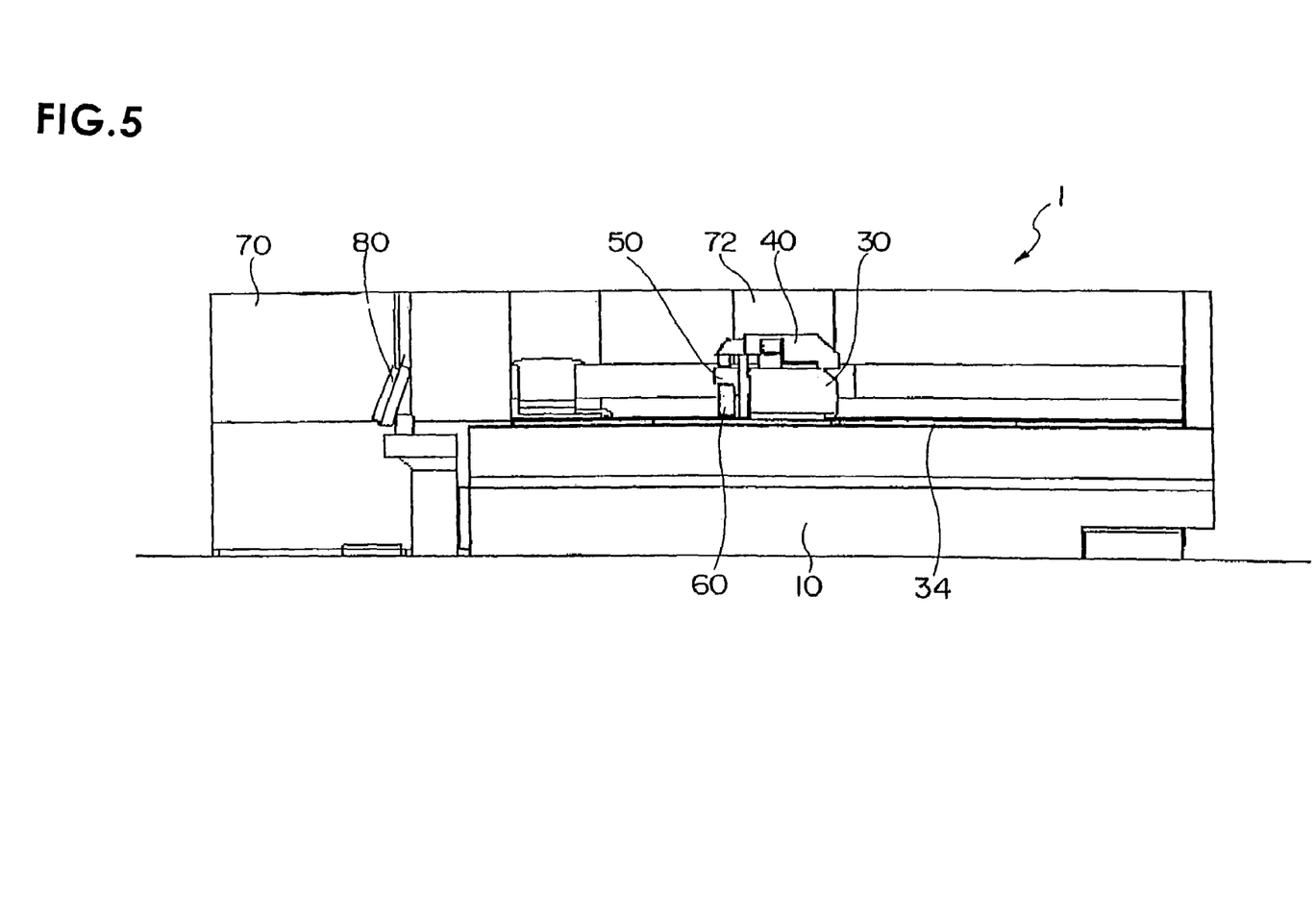
FIG. 5 is a side view of the essential part of the laser beam machine according to the present invention.

FIG. 1 is a perspective view showing an overall configuration of a laser beam machine according to the present invention, FIG. 2 is a plan view, FIG. 3 is a front view, FIG. 4 is a perspective view of the relevant portion, and FIG. 5 is a side view.

A laser beam machine, generally denoted by reference number 1, has a pallet (table) 20 which is disposed on a bed 10 to carry a plate-shaped workpiece $W_1$. A pallet changer 12 is placed on the longitudinal extension of the bed 10, and a pallet 20a carrying a workpiece $W_2$ to be machined next is awaiting its turn.

A pair of guide rails 34 are installed on both sides of the bed 10 along its length and a column 30 is mounted on the guide rails 34 in such a way as to be movable along an X axis.

Means for driving the column 30 along the X axis is provided by, for example, a linear motor, which is formed by a stator installed on the guide rails 34 and a moving member installed on a linear-motion guide 32.

A guide rail 44 is installed on the column 30 along a Y axis orthogonal to the X axis and a saddle 40 is mounted in such a way as to be movable along the Y axis. The saddle 40 is equipped with a linear-motion guide 42 which is engaged with the guide rail 44. A linear motor is formed by the guide rail 44 and linear-motion guide 42.

The saddle 40 has a guide rail installed along a Z axis perpendicular to the plane formed by the X axis and Y axis and has a machining head 50 mounted in such a way as to be movable along the Z axis. The machining head 50 has an optical system which admits a laser beam from a laser oscillator 72.

The machining head 50 is equipped replaceably with a laser machining tool 60. A machining area is fitted with a cover 90 to ensure safety. A power panel 70 and the laser oscillator 72 are disposed adjacent to the bed 10. A control panel 80 for use by the operator to give various commands is disposed on a longitudinal end of the bed 10. A setup station 100 for laser machining tools is installed on that end of the bed 10 which is closer to the control panel 80.

Figure 6:
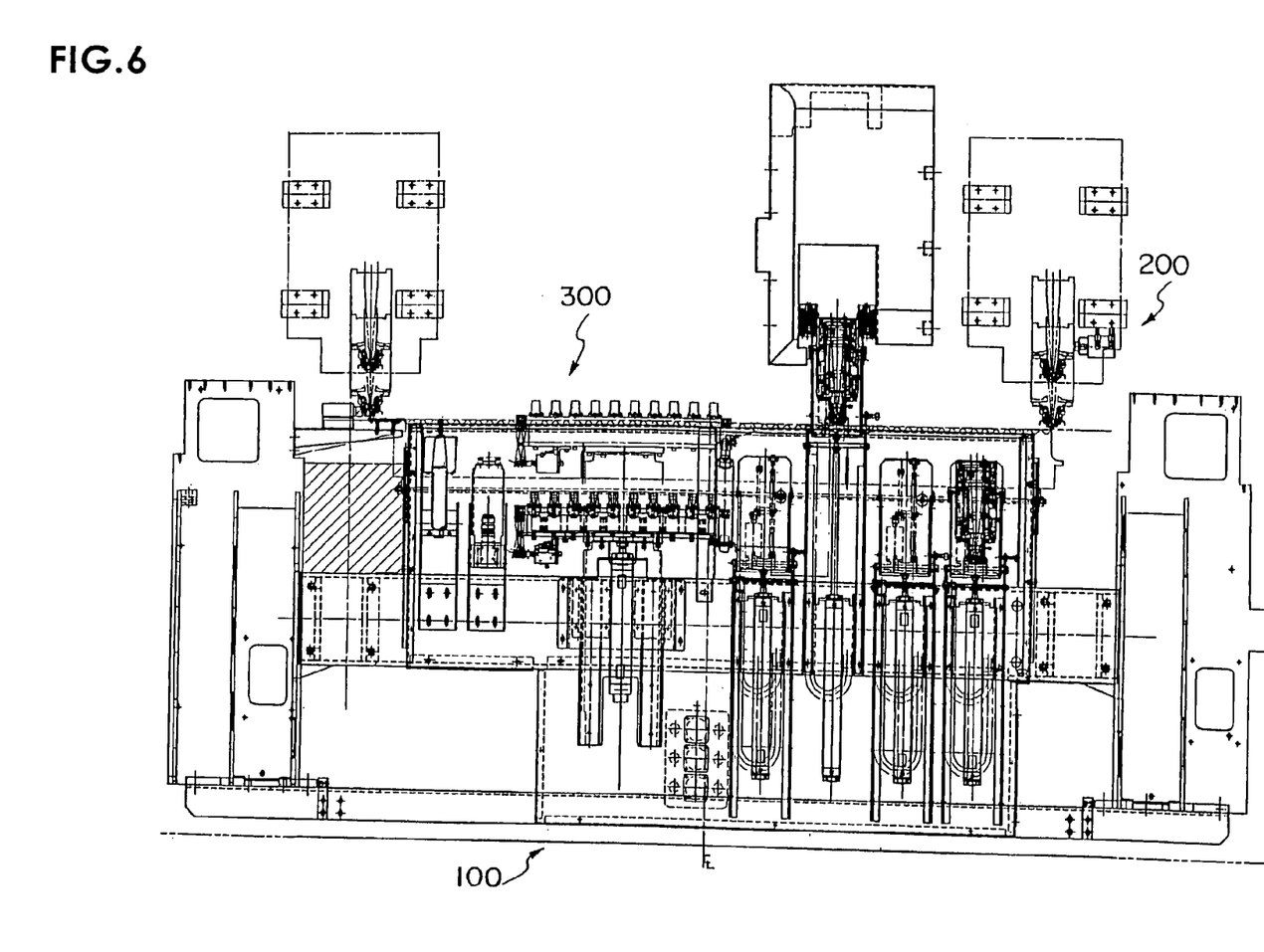
FIG. 6 is a front view of a setup station for laser machining tools.
Figure 7:
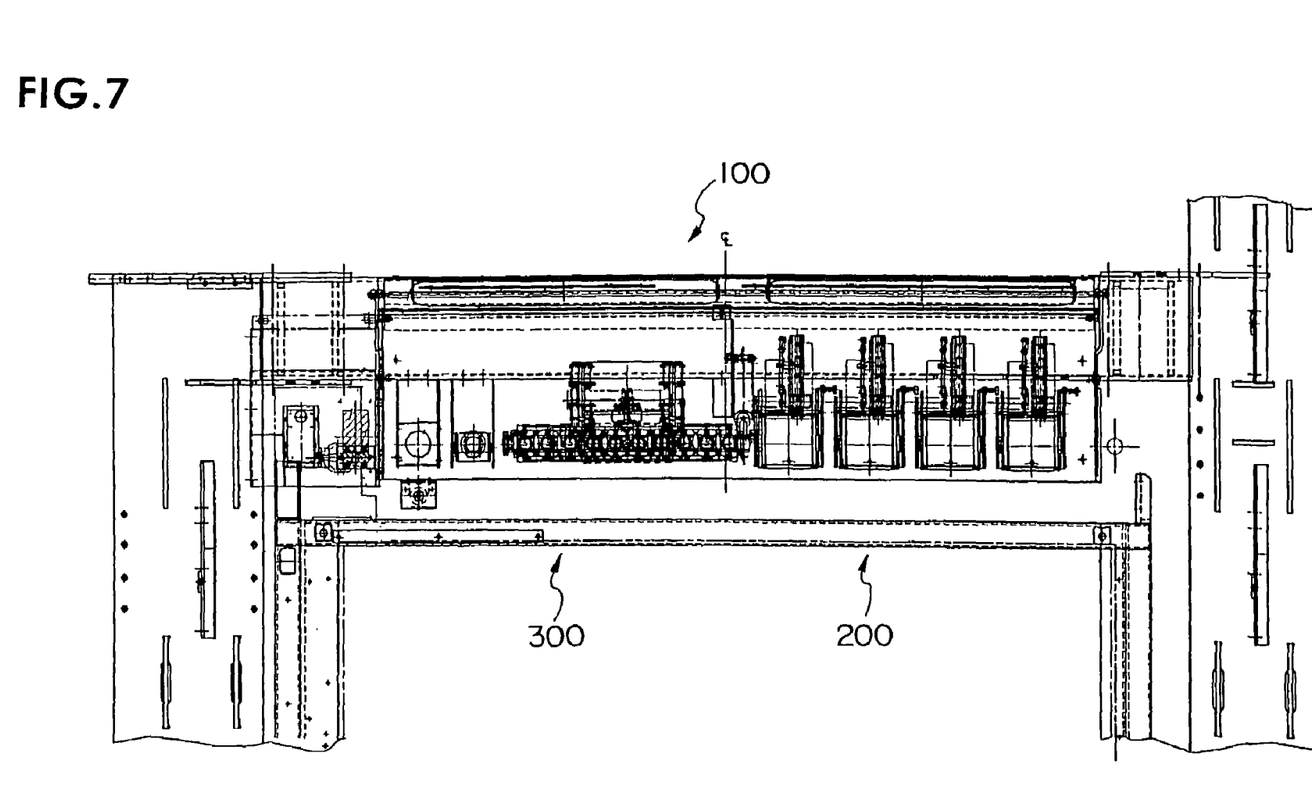
FIG. 7 is a plan view of the setup station for laser machining tools.

FIG. 6 is a front view of the setup station 100 for laser machining tools as viewed from the table and FIG. 7 is a plan view.

The setup station 100 for laser machining tools includes a tool station 200 and nozzle station 300, where the tool station 200 is equipped with a tool change magazine for laser machining tools which in turn are equipped with a torch and nozzle while the nozzle station 300 is equipped with a nozzle change magazine for nozzles of laser machining tools.

Figure 8:
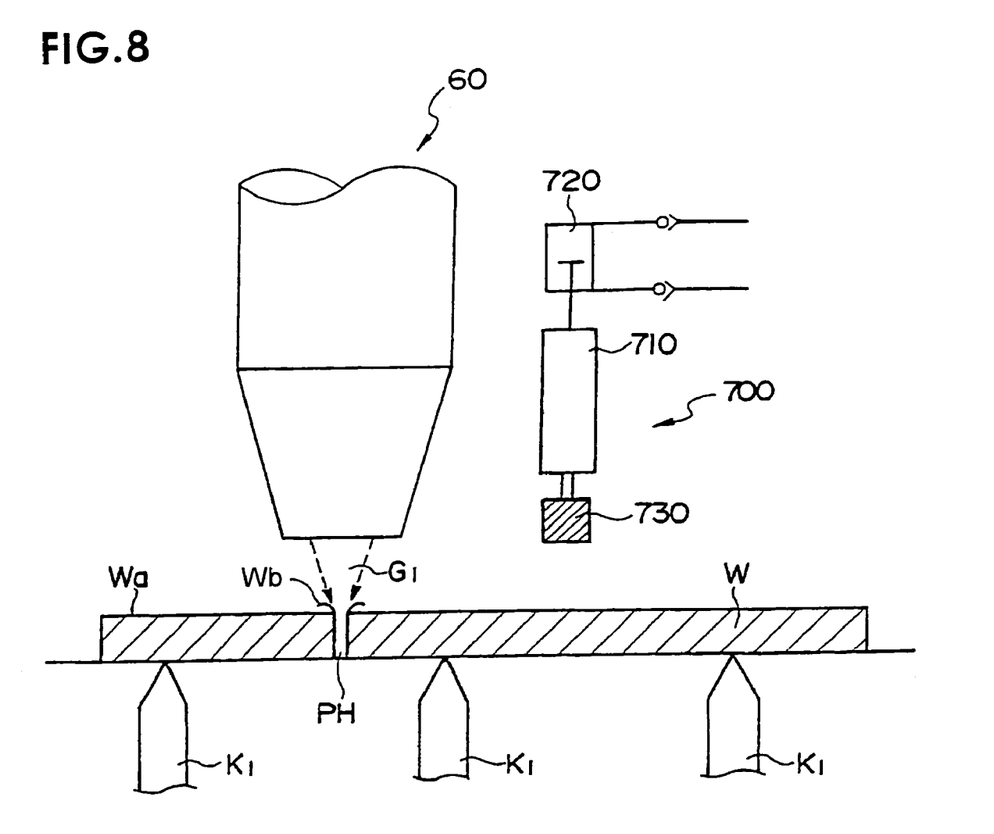
FIG. 8 is an explanatory diagram illustrating a whisker-like burr removal apparatus.

FIG. 8 is an explanatory diagram illustrating a whisker-like burr removal apparatus according to the present invention.

When the laser machining tool 60 produces, for example, pilot holes PH in a workpiece W (made of stainless steel, aluminum, or the like) placed on tapered pin-shaped supports K1, the laser machining tool 60 jets out assist gas G1 together with a laser beam.

For example, in the case of a stainless steel workpiece W, whisker-like burrs Wb are formed on the top surface of the workpiece when pilot holes PH are produced. The whisker-like burrs Wb are formed as molten particles of the stainless steel workpiece W scattered above under the pressure of the assist gas G1 and then cool down.

The laser machining tool 60 moves over the workpiece W, being profile-controlled at a predetermined height position above the top surface Wa of the workpiece W. The profile control is performed using a profile sensor which senses capacitance between the laser machining tool 60 and the top surface of Wa of the workpiece.

Existence of whisker-like burrs Wb on the top surface Wa of the workpiece W can cause malfunctions of a profile sensor, resulting in degradation of profile accuracy.

The whisker-like burr removal apparatus according to the present invention has the capability to remove the whisker-like burrs Wb formed on the top surface Wa of the workpiece W.

The whisker-like burr removal apparatus 700 has a machining head 710 which incorporates a motor and which is equipped with a machining tool 730.

The machining head 710 is mounted in such a way as to be raised and lowered by a cylinder 720.

When whisker-like burrs Wb are formed on the top surface Wa of the workpiece W, the machining head 710 is lowered to just above the whisker-like burrs W band the machining tool 730 removes the whisker-like burrs Wb.

A cylindrical grinding stone, end mill, or the like is used as the machining tool 730. The whisker-like burr removal apparatus 700 can be mounted on appropriate part of the machining head or the saddle of the laser beam machine. Alternatively, it can be mounted on the laser beam machine as a unit separate from the machining head.

The removal of whisker-like burrs can be carried out while the machining head is machining another portion.

Consequently, a piercing program extracted from a nesting program created on a CAM or NC system (number control system) can be used for control.

Alternatively, it is possible to use a dedicated whisker-like burr removal program or manual control.

Incidentally, although a linear motor has been cited in the above example as a driving means along the X and Y axes, the present invention can also be applied using a ball screw.

What is claimed is:

1. A laser beam machine, comprising:
   a bed,
   a pallet which is disposed on the bed and holds a workpiece,
   a column which moves along an X axis, that is, in a longitudinal axis of the bed,
   a saddle which is supported by the column and moves along a Y axis orthogonal to the X axis,
   a machining head equipped with a laser machining tool and an assist gas jet, the machining head being supported by the saddle and moving along a Z axis perpendicular to a plane formed by the X axis and Y axis, the laser machining tool being profile-controlled relative to the workpiece, and
   a burr removal apparatus for removing whisker-like burrs formed on a top surface of the workpiece during laser machining in order to reduce malfunctions of the profile control due to the whisker-like burrs, without necessitating cessation of the laser machining of the workpiece.

2. The laser beam machine according to claim 1 wherein the workpiece is made of stainless steel or aluminum material.

3. The laser beam machine according to claim 1 wherein the burrs are formed of molten particles.

4. The laser beam machine according to claim 1 the burr removal apparatus comprising a machining head raised and lowered from/to a workpiece surface, and a machining tool driven to rotate by the machining head.

5. The laser beam machine according to claim 4, wherein the machining tool is a grinding tool or a cutting tool.

* * * * *